April 9, 1935.   O. M. NACKER ET AL   1,996,824
CHASSIS CONSTRUCTION
Filed Nov. 16, 1933

Inventors
Owen M. Nacker &
Maurice Olley
By Blackmore, Spencer & Flint
Attorneys Patented Apr. 9, 1935

1,996,824

UNITED STATES PATENT OFFICE 1,996,824

CHASSIS CONSTRUCTION

Owen M. Nacker and Maurice Olley, Pleasant Ridge, Mich., assignors to General Motors Corporation, Detroit, Mich., a corporation of Delaware Application November 16, 1933, Serial No. 698,288

7 Claims. (Cl. 180—73)

This invention relates to the chassis construction of a motor vehicle having the driving wheels supported on the ends of lever or radius arms pivoting about an axis transverse to the vehicle for movement of the driving wheels in a vertical plane parallel with the longitudinal axis of the vehicle.

It relates particularly to such a chassis construction in which the lever arms are independently pivotable and thus providing for so-called "independent suspension" of the driven road wheels.

As usually constructed, there is difficulty in providing a sufficiently rigid pivot for the lever arms which will be "softly" connected to the frame so that forces at the road wheels will not shake the car badly.

The housing for bevel gearing taking the drive from the propeller shaft to the road wheels is ordinarily supported on the vehicle frame, and universally jointed drive shafts take the drive therefrom to each road wheel, and it is another problem of such independent suspension systems to obtain a "soft" but rigid mounting of the differential housing in the frame.

One object of the invention is to provide the required kind of mounting for the housing of the bevel driving gears, and for a trunnion constituting the pivot for the wheel supporting radius or lever arms in the frame of the vehicle, by combining the trunnions with the housing and supporting the combination in the frame at three points of which two are close to their respective lever arms, all whereby an economy in frame structural members is achieved.

It is a further object of the invention to provide the assembly consisting of the housings and the trunnion with a soft cushion mounting in the frame thereby to provide a little flexibility in all directions including a little lateral resilience to cushion side shocks at the rear wheels.

Another object of the invention is to combine with the foregoing a device restraining to some extent the "independent" pivotal movement of the lever arms on opposite sides of the vehicle in order to reduce the roll of the body relatively to the road wheels as a result of the centrifugal forces acting on the vehicle when the car is moving other than in a straight line.

The above and other objects of the invention will be apparent as the description proceeds.

According to the invention the soft mountings consist preferably of rubber but may be of any other suitable resilient yielding material.

The drawing shows the application of the invention to the rear driven road wheels of a motor vehicle having the wheel supporting lever arms fulcrumed forward of the wheels.

In the drawing

Figure 1:
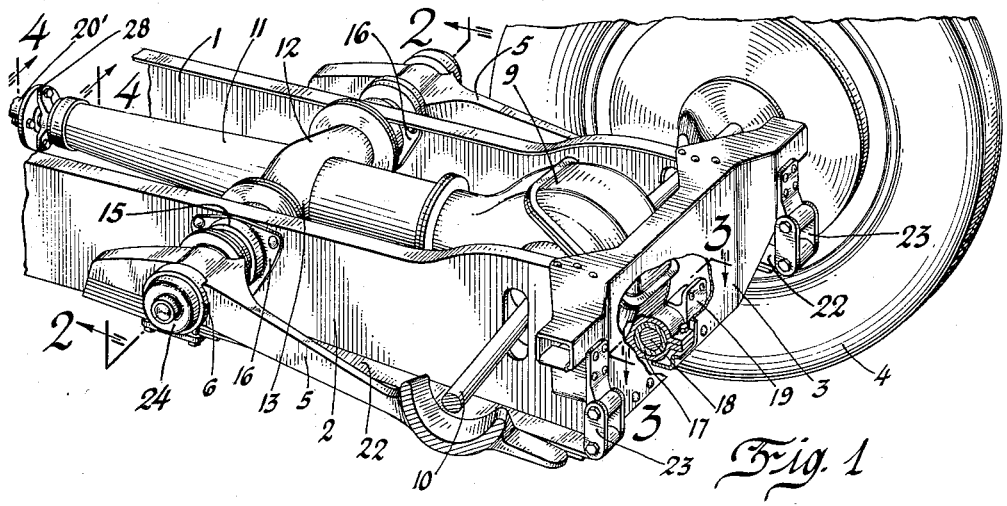
Figure 1 is a perspective view of the rear end of the chassis of an automobile according to the invention.
Figure 2:
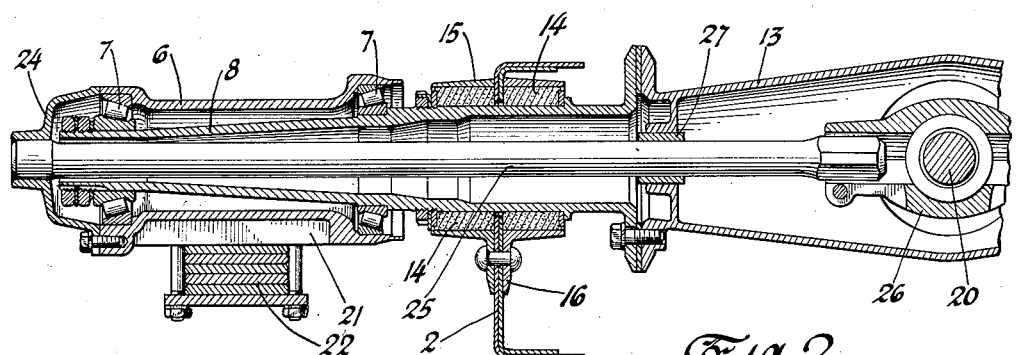
Figure 2 is a part-sectional view on line 2—2 of Figure 1.
Figures 3, 4:
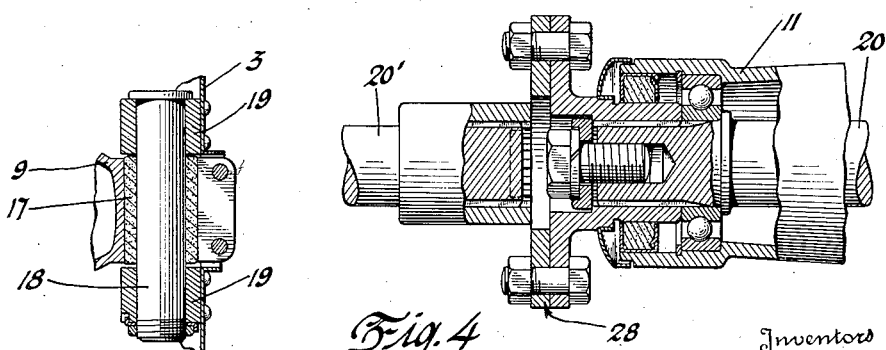
Figure 3 is a part-sectional view on line 3—3 of Figure 1.
Figure 4 is an enlarged part-sectional view on line 4—4 of Figure 1.

The vehicle frame has two side or longitudinal members 1 and 2 and a rear cross member 3.

Each rear wheel 4 is mounted on bearings in turn supported by hollow hubs (not shown) integral with lever arms 5 which have hollow hubs 6 supported on bearings 7 on tubular shafts or trunnions 8 located transversely of the vehicle and forward of the wheels 4.

The housing 9 for gearing taking the drive from the propeller shaft to universally jointed wheel drive shafts 10 has attached to it a tubular cross shaped member 11 to the lateral transverse arms 12 and 13 of which also are attached the tubular shafts 8. These tubular shafts 8 are mounted in rubber bushings 14 supported in bearings 15 through the frame side members 1 and 2, and provided with flanges 16 for attachment thereto.

The rear end of the housing 9 is supported on the rear cross member 3 through a rubber bushing 17 interposed between the housing 9 and a shaft 18 supported in brackets 19 rigidly attached to the rear cross member 3.

A propeller shaft extension 20 is suitably supported in bearings in the longitudinal branches of the cross-shaped member 11 through which it extends. The propeller shaft extension 20 is connected to the propeller shaft 20' through a universal joint 28.

A spring perch 21 is formed on the hubs 6 of the lever arms 5 to which a reversed quarter elliptic leaf spring 22 is bolted. The other end of the leaf spring is connected to the frame through a suitable shackle 23.

Rigidly attached to each hub 6 is a hub cap 24. Two rods 25 (of which one only is shown) each have one end rigidly held in one of the hub caps and their other ends splined in a yoke or coupling member 26 bridging the propeller shaft extension 20. These rods are coaxial with the hubs 6 and the trunnions 8 through which they pass, and are supported in bearings 27 in the branches 12 and 13 of the cross-shaped member 11. In this way the lever arms 5 are connected together through the assembly of the rods 25 and the yoke 26 so that the independent movement of the lever arms will be resiliently restrained by the torsional resistance of the rods 25. The function of this connecting means between the lever arms is to prevent excessive differential deflection of the springs such as occurs when the vehicle is moving round a curve at a speed such that centrifugal effects will cause a transfer of load from that spring which is to the inside of the curve to that which is to the outside. The connecting means thus serves as an "anti-roll" device. It is at the same time sufficiently weak torsionally to permit of sufficiently "independent" action of the lever arms.

We claim:

1. In a motor vehicle, in combination, a frame, a pair of road wheels, a propeller shaft, gearing between the propeller shaft and the road wheels, a housing for the gearing, a lever arm support for each road wheel, each lever arm being disposed longitudinally of the vehicle, bearings on the housing for independent pivotal movement of each lever arm support relative thereto, resilient connecting means between the lever arms resiliently restraining independent pivotal movement thereof, and a three point resilient mounting of the housing in the frame.

2. The combination according to claim 1 in which the resilient connecting means between the lever arms comprises a torsionally resilient connecting means coaxial with the pivot axes of the lever arms resiliently restraining independent pivotal movement of the lever arms.

3. In a motor vehicle, in combination, a frame including side members, a differential housing, a tubular cross-shaped member attached thereto having two coaxial arms extending horizontally and transversely of the vehicle, a shaft extension for each of the aforesaid arms, means whereby the assembly consisting of the differential housing and the cross-shaped member is attached to the frame at three points including a mounting for each shaft extension in the frame side members, a longitudinally disposed lever arm on each of the shaft extensions mounted for pivotal movement thereabout, a road wheel mounted on each of the lever arms, drive shafts from the differential housing to each of the road wheels and means resiliently restraining pivotal movement of the lever arms.

4. The combination according to claim 3 in which the assembly consisting of the differential housing and the cross-shaped member is resiliently mounted in the frame.

5. The combination according to claim 3 in which the shaft extensions are tubular, and in conjunction with the tubular shaped cross member form a housing for a propeller shaft extension and for torsionally resilient means connecting together the two lever arms.

6. In a motor vehicle in combination, a frame, a pair of road wheels, a propeller shaft extension, a differential gear, universally jointed drive shafts from the differential to the road wheels, a lever arm support for each road wheel arranged to pivot relatively to the frame about an axis transverse thereto, torsionally resilient connecting means coaxial with the pivot axis of the lever arms resiliently restraining independent pivotal movement thereof, a housing for the propeller shaft extension, the differential gear and the torsionally resilient connecting means, means whereby the housing is resiliently supported in the frame and means resiliently restraining pivotal movement of the lever arms.

7. The combination according to claim 6 in which the axes of the propeller shaft extension and the torsionally resilient connecting means are intersecting and a yoke encircling the propeller shaft extension forms one element of the torsionally resilient connecting means.

OWEN M. NACKER.
MAURICE OLLEY.